United States Patent
Kotani et al.

(10) Patent No.: US 9,112,681 B2
(45) Date of Patent: Aug. 18, 2015

(54) METHOD AND APPARATUS FOR SECURE INFORMATION TRANSFER TO SUPPORT MIGRATION

(75) Inventors: Seigo Kotani, College Park, MD (US); Zhexuan Song, College Park, MD (US); Sung Lee, College Park, MD (US); Jesus Molina, College Park, MD (US); Ryusuke Masuoka, College Park, MD (US)

(73) Assignee: FUJITSU LIMITED, Kawasaki (JP)

( * ) Notice: Subject to any disclaimer, the term of this patent is extended or adjusted under 35 U.S.C. 154(b) by 1402 days.

(21) Appl. No.: 11/966,283

(22) Filed: Dec. 28, 2007

(65) Prior Publication Data

US 2010/0023755 A1 Jan. 28, 2010

Related U.S. Application Data

(60) Provisional application No. 60/945,876, filed on Jun. 22, 2007.

(51) Int. Cl.
| | |
|---|---|
| H04L 29/06 | (2006.01) |
| H04L 9/00 | (2006.01) |
| H04L 9/32 | (2006.01) |
| H04L 9/08 | (2006.01) |
| G06F 21/33 | (2013.01) |
| G06F 21/60 | (2013.01) |

(52) U.S. Cl.
CPC ............... *H04L 9/083* (2013.01); *G06F 21/33* (2013.01); *G06F 21/606* (2013.01); *H04L 9/006* (2013.01); *H04L 9/0825* (2013.01); *H04L 9/0897* (2013.01); *H04L 9/321* (2013.01); *H04L 9/3234* (2013.01); *H04L 9/3263* (2013.01); *H04L 63/0823* (2013.01); *G06F 2221/2101* (2013.01); *H04L 2209/127* (2013.01)

(58) Field of Classification Search
CPC ............ H04L 2209/56; H04L 63/0823; H04L 9/0897; H04L 9/3263; H04W 84/045; H04W 12/04; H04W 12/06; H04W 88/08; H04W 8/005; H04W 12/10; G06F 21/74
USPC ...................................... 713/175, 156; 726/9
See application file for complete search history.

(56) References Cited

U.S. PATENT DOCUMENTS

| | | | | |
|---|---|---|---|---|
| 5,371,794 | A * | 12/1994 | Diffie et al. .................... | 713/156 |
| 5,631,961 | A * | 5/1997 | Mills et al. .................... | 380/286 |
| 6,085,320 | A * | 7/2000 | Kaliski, Jr. .................... | 713/168 |
| 6,385,723 | B1 * | 5/2002 | Richards ........................ | 713/160 |
| 6,904,522 | B1 * | 6/2005 | Benardeau et al. ............ | 713/156 |
| 7,281,010 | B2 * | 10/2007 | Challener ...................... | 380/277 |
| 7,424,610 | B2 * | 9/2008 | Ranganathan ................ | 713/164 |
| 7,444,670 | B2 * | 10/2008 | Berger et al. ...................... | 726/3 |
| 7,516,321 | B2 * | 4/2009 | Chen et al. ..................... | 713/155 |
| 7,568,051 | B1 * | 7/2009 | Linstead ............................ | 710/1 |
| 7,577,839 | B2 * | 8/2009 | England et al. ................ | 713/165 |
| 7,600,134 | B2 * | 10/2009 | Catherman et al. ........... | 713/193 |
| 7,634,664 | B2 * | 12/2009 | Ibrahim et al. ................ | 713/189 |

(Continued)

*Primary Examiner* — Arvin Eskandarnia
*Assistant Examiner* — Margishi Desai
(74) *Attorney, Agent, or Firm* — Staas & Halsey LLP

(57) ABSTRACT

A system and method are disclosed for providing and maintaining a high level of security during migration of data from one platform to another. The disclosed system combines user and equipment authentication with equipment environment authorization guaranteed by a security module such as supported by a trusted platform module (TPM) in parallel, for secure information transfer to support migration between platforms.

20 Claims, 8 Drawing Sheets

(56) References Cited

U.S. PATENT DOCUMENTS

| | | | |
|---|---|---|---|
| 7,765,396 B2* | 7/2010 | Haufe | 713/155 |
| 2002/0154779 A1* | 10/2002 | Asano et al. | 380/277 |
| 2003/0016827 A1* | 1/2003 | Asano et al. | 380/277 |
| 2003/0088772 A1* | 5/2003 | Gehrmann et al. | 713/175 |
| 2003/0097558 A1* | 5/2003 | England et al. | 713/155 |
| 2003/0196084 A1* | 10/2003 | Okereke et al. | 713/156 |
| 2005/0005098 A1* | 1/2005 | Michaelis et al. | 713/156 |
| 2005/0086504 A1* | 4/2005 | You et al. | 713/193 |
| 2005/0138389 A1* | 6/2005 | Catherman et al. | 713/185 |
| 2005/0223221 A1* | 10/2005 | Proudler et al. | 713/164 |
| 2006/0072748 A1* | 4/2006 | Buer | 380/44 |
| 2006/0072762 A1* | 4/2006 | Buer | 380/277 |
| 2007/0094719 A1* | 4/2007 | Scarlata | 726/9 |
| 2007/0226786 A1* | 9/2007 | Berger et al. | 726/9 |
| 2008/0059799 A1* | 3/2008 | Scarlata | 713/176 |
| 2008/0162353 A1* | 7/2008 | Tom et al. | 705/51 |
| 2009/0013393 A1* | 1/2009 | Xi | 726/7 |
| 2009/0031141 A1* | 1/2009 | Pearson et al. | 713/187 |
| 2009/0328145 A1* | 12/2009 | Berger et al. | 726/3 |
| 2011/0283352 A1* | 11/2011 | Berger et al. | 726/16 |

* cited by examiner

METHOD AND APPARATUS FOR SECURE INFORMATION TRANSFER TO SUPPORT MIGRATION

CROSS-REFERENCE TO RELATED APPLICATIONS

This application is related to and claims the benefit of U.S. Application Ser. No. 60/945,876, filed Jun. 22, 2007, inventor Seigo KOTANI et al., titled METHOD AND APPARATUS FOR SECURE INFORMATION TRANSFER TO SUPPORT MIGRATION, in the United States Patent and Trademark Office, the disclosure of which is incorporated herein by reference.

BACKGROUND

1. Field

The present invention is directed to secure information transfer and, more particularly, to a method and apparatus for secure transfer of information to support migration.

2. Description of the Related Art

Trusted communications are essential for secure exchange of information and/or services. As development of various types of devices continues to grow, the ability to establish trusted communications among various devices and/or across different platforms is crucial, and trusting identities of consumer(s) and provider(s), authenticity of contents exchanged, and integrity of devices involved becomes more complex. Unfortunate consequences resulting from the lack of secure communications between devices is exacerbated as use of devices for exchanging sensitive information such as data necessitated to complete financial transactions, personal transactions, etc., increases. However, current communications still rely on weak security solutions, compromising integrity of information and leaving many systems venerable to attacks.

To address the risks caused by inadequate security solutions, integrated security hardware components have been developed which not only strengthen software solutions, but also assure built in protection. However, typical integrated hardware security components do not provide a flexible and trusted migration technique for transferring information from one device and/or platform to another. In particular, it is very difficult to transfer information controlled by an integrated hardware component when a user wants to transfer the information resident on one platform and/or device to another. As such, techniques that make it very easy for information transfer and migration without compromising trust and security are desirable.

Typical solutions of transfer operate so that a key in one platform is required to be brought out (retrieved), encrypted and transferred to another platform. This requires data inside a platform to be decrypted by keys inside a hardware component and encrypted by a session (temporary) key at transfer. Only then can a root of trust based on the hardware component be transferred. However, in doing so, the transfer is required to be executed by relying on software solutions and thereby loses any trust established based on a hardware component. Further, these solutions and other similar techniques have low usability because each data in the platform of origin must be decrypted and encrypted in association with transfer of the data to the destination platform.

Moreover, these solutions do not allow information utilized for equipment, user and equipment environment authorization to be controlled independent of one another, and require full control of the information by the hardware component. Further, current approaches assume that user authentication and/or equipment authentication are operated under control of the equipment environment authorization procedure.

In order to ensure authenticity and security of information, a level of trust may be established between communicating devices. To this end, the Trusted Computing Group™ (TCG) has defined a set of specifications for establishing and maintaining trust between two or more devices based on a hardware root of trust. The hardware root of trust, in other words, an LSI chip implementing a Trusted Platform Module (TPM) is based on the TCG specification and generally can not be removed from a platform such as a personal computer (PC), cell phone, etc.

FIG. 1 describes a typical migration mechanism 10 of transferring information of platform 1 to platform 2. As shown in FIG. 1, platform 1 includes an application 14 and a TPM chip 16. The TPM chip 16 includes a TCG software stack (TSS) 18 that provides a standard application program interface (API) for accessing functions of the TPM chip 16, and a TPM component 20. The TPM component 20 collectively and centrally controls a TPM part for environment authorization, a public key infrastructure (PKI) part for equipment authentication and a BIO part for user authentication. Similarly, platform 2 includes an application 22 and a TPM chip 23 having a TCG software stack (TSS) 24 and a TPM component 26 storing therein a TPM part for environment authorization, a PKI part for equipment authentication and a BIO part for user authentication. In this case, in both the platforms 1 and 2, the TPM parts control the respective PKI parts and the BIO parts.

According to the mechanism 10, when information of platform 1 is to be transferred to platform 2, a certified migration key 1 (CMK1) is generated with respect to platform 1 and a certified migration key 2 (CMK2) is generated with respect to platform 2. A certificate authority (CA) 12 certifies the migration key 1 and the migration key 2. The platform 1 then requests for the public part of the migration key of the platform 2 (CMK2) and the public part of the migration key 2 (CMK2) is sent to the platform 1 from the platform 2 via the CA 12. Description of key(s) in association with FIGS. 1 and 2 refers to known cryptographic algorithms including use of a pair of keys (private and public), used for encryption and decryption.

Subsequent to receipt of the public part of the migration key 2 (CMK2), a session key is created using platform 1 and the session key is encrypted with the public part of the migration key 2 (CMK2) and sent to the platform 2 via the CA 12. In this case, the only communication path between the PKI part of platform 1 and the PKI part of platform 2 is through the Certificate Authority (CA). More specifically, as denoted in FIG. 1, there is no direct communication path between the TPM component 20 of platform 1 and the TPM component 26 of platform 2.

The platform 2 receives the encrypted session key and decrypts the session key with a private part of the certified migration key 2 (CMK2). Data inside the platform 1 that is to be migrated is decrypted with the TPM part of platform 1, encrypted with the session key within the TPM part of platform 1 and the encrypted migration part is transmitted to platform 2 via the CA 12. When the encrypted migration part is received by the platform 2, the data is decrypted with the session key. Platform 2 then re-encrypts the data received and loads the re-encrypted data in the TPM part of the platform 2.

As shown in FIG. 1, the typical migration mechanism 10 does not enable the hardware root of trust to be transferred from platform 1 to platform 1. Instead, the mechanism 10 requires data of platform 1 to be decrypted by keys inside the TPM part of platform 1 and encrypted by a temporary (session) key when the data is transferred. Therefore, information/data controlled by the TPM part of platform 1 cannot be securely transferred in a case where a user wants to migrate data from platform 1 to platform 2. Currently, there are only systems that contain only TPM components in both origin (i.e., platform 1 in FIG. 1) and destination (i.e., platform 2). Accordingly, as shown in FIG. 1 with a dotted line, a migration path cannot be established between the TPM component 20 of platform 1 and the TPM component 26 of the platform 2 (i.e., TPM#1 of platform 1 and TPM#2 of platform 2) since both are hardware based and cannot be transferred, and TPM components 20 and 26 do not know each other.

The typical migration mechanism 10 of FIG. 1 requires data of platform 1 to be removed from the TPM component 20 based on information of the CA 12, be encrypted and passed though the CA 12. The data from platform 1 is then delivered to the TPM component 26 of platform 2 in order to transfer from one platform to another. The data is then decrypted based on TPM of platform 2. Essentially, mechanism 10 and other similar techniques eliminate or compromise reliability and trust provided by a hardware root of trust due to use of software standard and encryption.

As shown in FIG. 1, the TPM component 20 and the TPM component 26 contain a corresponding PKI part of platforms 1 and 2 for equipment authentication, and a corresponding BIO part for user authentication. That is, the PKI part for equipment authentication and the BIO part for user authentication of both platforms 1 and 2 are provided in a hierarchical level lower than that of the TPM part used for equipment authorization.

In a situation where data of platform 1 is encrypted based on TPM of platform 1 and is transferred to platform 2, key information has to be transferred since the data cannot be readily used in platform 2. For example, to transfer data residing on a PC that is encrypted based on a TPM of the PC, to a new PC, decryption information has to also be transferred to the new PC for the data to be useable therein.

FIG. 2 illustrates a technique 30 where a temporary password is used to transfer encryption/decryption data from platform 1 to platform 2. As shown in FIG. 2, platform 1 includes an application 14a and a TPM chip 16a and platform 2 includes an application 22a and a TPM chip 23a. The TPM chip 16a of platform 1 contains a TCG software stack (TSS) 18a and a TPM component 20a, and the TPM chip 23a of platform 2 contains a TSS 24a and a TPM component 26a. The TPM component 20a and the TPM component 26a corresponding to platforms 1 and 2, respectively, control the TPM storage root key (SRK) part and the PKI part.

In technique 30, platform 1 encrypts data to be migrated with the certificate authority's 12 public key (CAKP), protected by a user's password (PW). A packet containing the encrypted data is sent from platform 1 to the certificate authority (CA) 12. The CA 12 receives the packet, decrypts the package using a private part of the CA 12 (CAKS), and gets a public key of platform 2 (P2KP). Then, the CA 12 re-encrypts the package using the public part of platform 2 (P2KP), and transfers the package to platform 2. Then, the user entered password (PW) is transmitted from the TPM component 20a in platform 1 to the TPM component 26a of platform 2.

When the packet is received at platform 2, platform 2 decrypts the package using a private key part of platform 2 (P2KS) with the password (PW) sent from the platform 1 and loads data to be migrated into the TPM component 26a of platform 2. In this case, use of such a temporary or user's password does not enable a very secure transmission of the root key encryption/decryption data, and therefore provides only low level security.

The migration techniques shown in FIGS. 1 and 2 further assume that user authentication and/or equipments authentication are operated under the control of the equipment environment authorization procedure of an integrated hardware security. Accordingly, techniques that enable a flexible and secure transfer and migration of data with a TPM are very desirable.

Although developments have been made to address information security, there is a need for a method and apparatus for secure information transfer to support migration and enable user authentication and device validation which are essential for trusted exchange of data.

SUMMARY

A method and apparatus is disclosed for secure information transfer to support migration. The method includes certifying a public key infrastructure module of a first platform, where the public key infrastructure module is certified using a trusted platform module of the first platform, and directly transferring data of the first platform to a second platform to be used based on certification of a trusted platform module of the second platform.

The disclosed method and apparatus provide a secure transfer of information where a public key infrastructure module of a first platform encrypts keys and a certificate based on a trusted platform module of a second platform, and sends the keys and a certificate to the second platform.

Additional aspects and/or advantages will be set forth in part in the description which follows and, in part, will be apparent from the description, or may be learned by practice of the invention.

The disclosed method and system combines user and equipment authentication with equipment environment authorization (such as supported by Trusted Platform Module (TPM)) in parallel for secure information transfer to support migration between platforms.

The disclosed apparatus includes a chip implemented with a public key infrastructure module and a trusted platform module of a first platform and a controller controlling the public key infrastructure module parallel with a trusted platform module of a first platform.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE PREFERRED EMBODIMENTS

Figure 1:
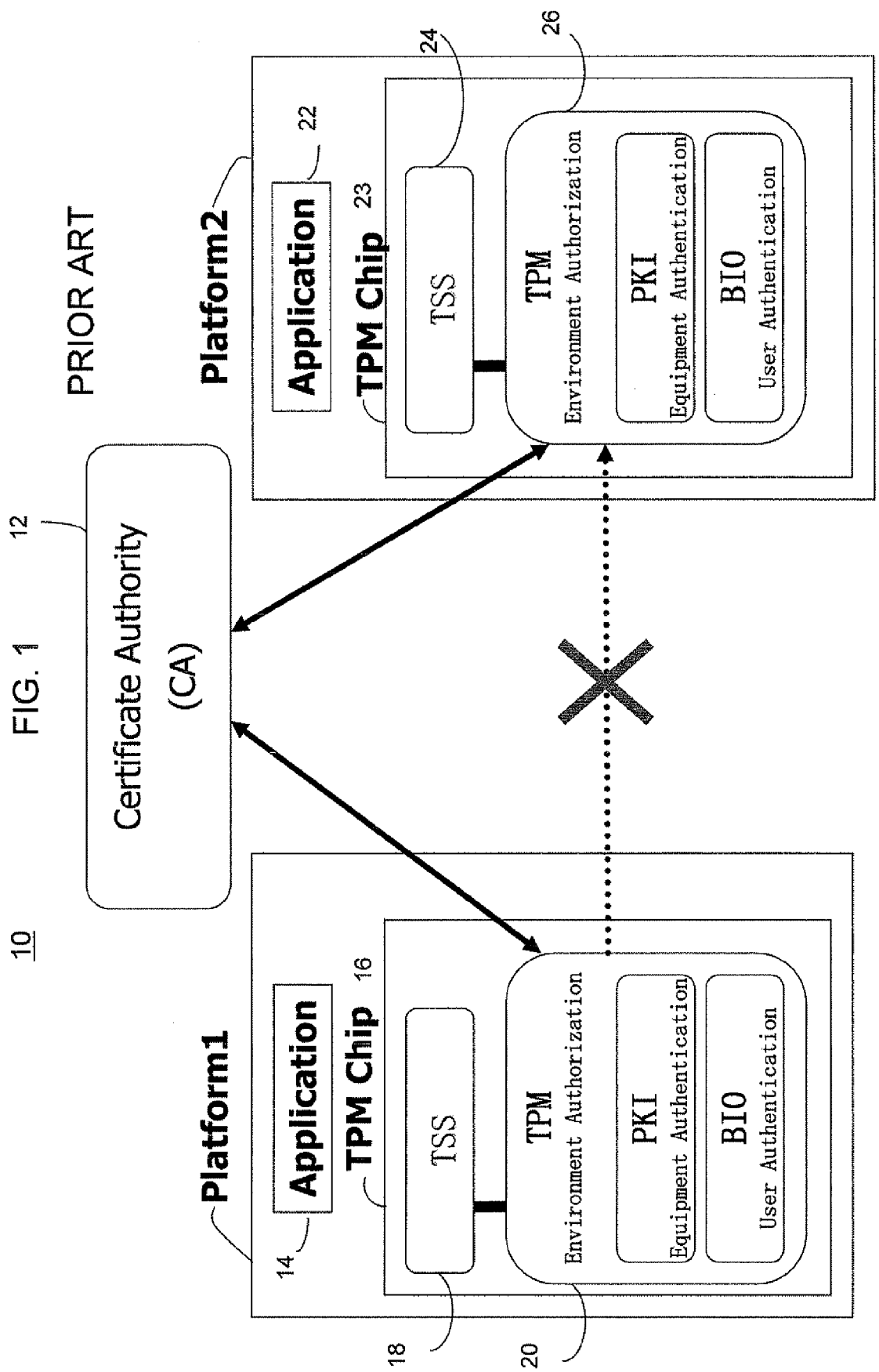
FIG. 1 illustrates a typical key migration system providing a communication path only through a certificate authority (CA).
Figure 2:
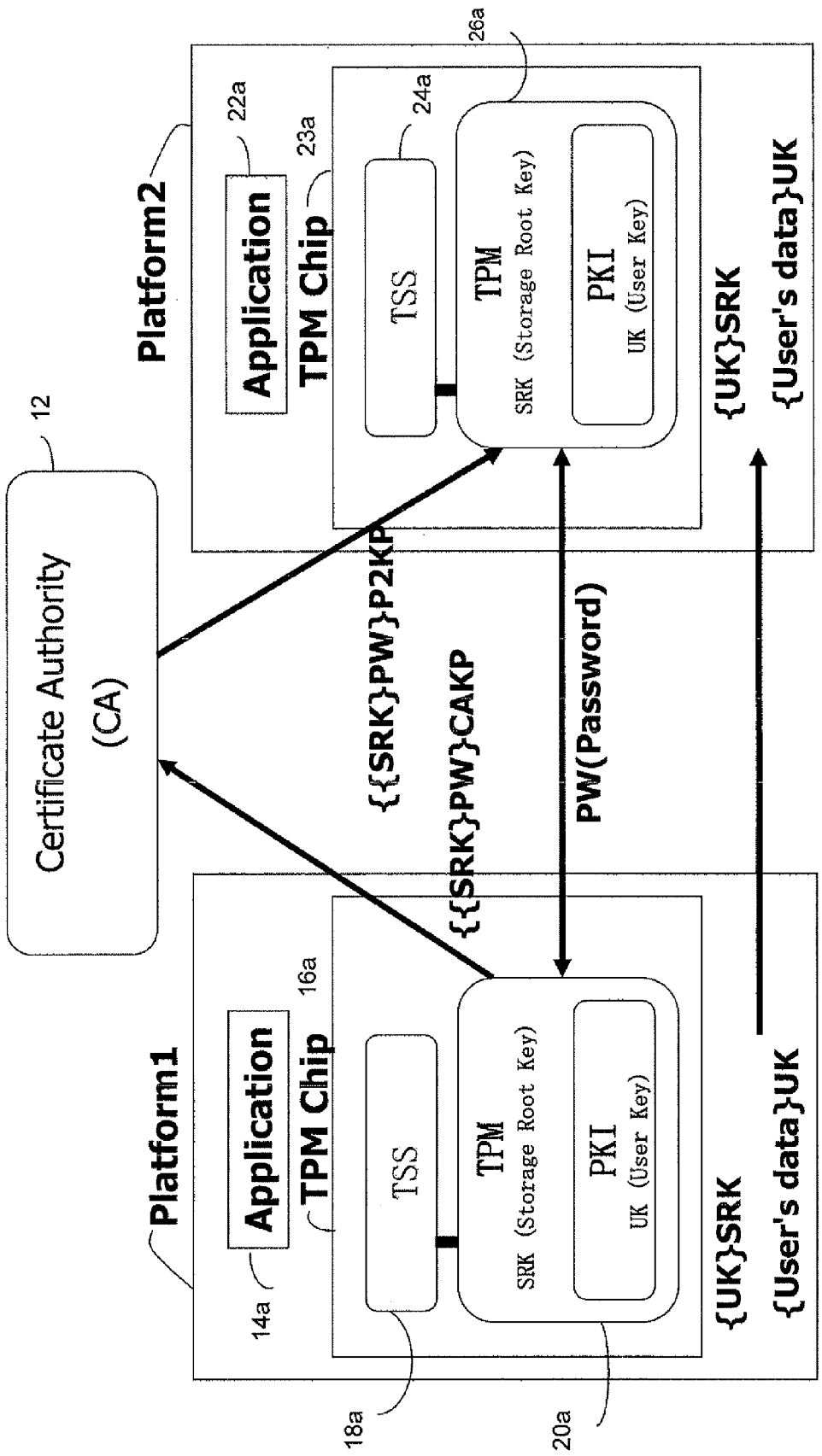
FIG. 2 illustrates a diagram of a typical key migration system transmitting a user entered password (PW) from platform 1 to platform 2.

Reference will now be made in detail to the present embodiments discussed herein, examples of which are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate.

A method, apparatus and system is provided for secure transfer of information to support migration between two or more platforms and/or devices. References throughout the description of the disclosed system and method pertaining to "key" or "key pair", "CA" or "certification authority" "encryption" and "decryption" refer to cryptography concepts including public key infrastructure. However, the disclosed invention is not limited to any particular algorithm or technique for authenticating or certifying a user, a platform, and/or a device. For example, other types of verification in combination or instead of a public key cryptography including but not limited to algorithms, passwords, etc., may be implemented using the disclosed method and system.

Platform(s) as referred to herein may include any hardware, software, or a combination thereof. For example, a platform may be a device using which a user can exchange information with another device including but not limited to a personal computer (PC), a specialized device, a laptop computer, a personal digital assistant (PDA), a television, a peripheral such as a router, a printer, a scanner, a cellular phone, a home appliance such as a refrigerator, microwave oven, etc. A platform may also include an operating system (OS), an application program, or any other software used to execute operations, including but not limited to network computing protocols and infrastructures supporting various operating systems and network hardware.

The disclosed system and method enables migration of information using a trust established between two or more platforms in accordance with hardware based report(s) corresponding to the platforms. The disclosed system supports migration of information guaranteed and verified based on a trusted platform module (TPM) of one platform to another platform while still conforming to trusted computing features provided by the Trusted Computing Group™ (TCG).

Figure 3:
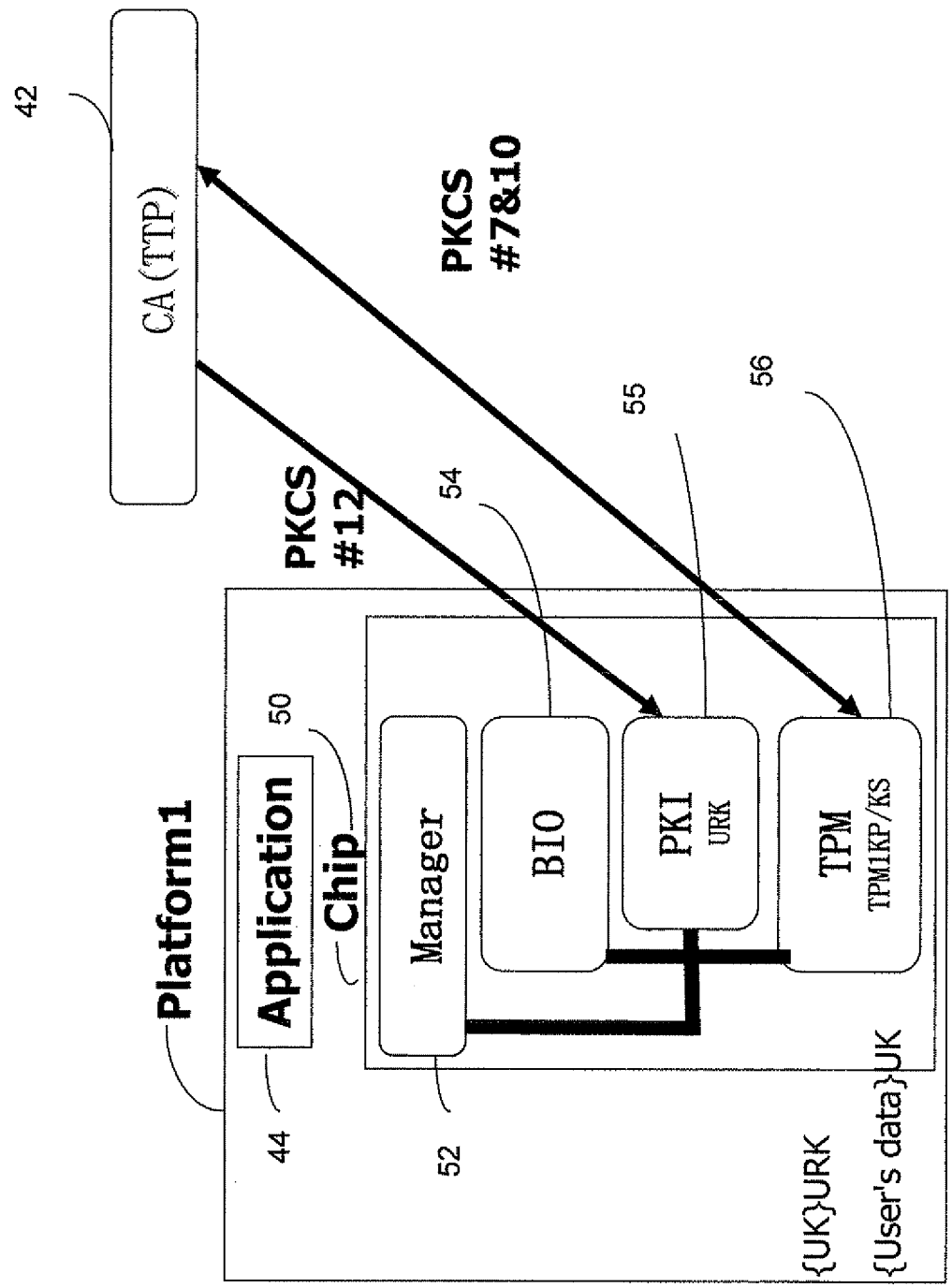
FIG. 3 illustrates a system for secure information transfer to support migration.

FIG. 3 illustrates a system 40 for secure information transfer to support migration. As shown in FIG. 3, platform 1 includes an application 44 and a chip 50. The chip 50 is provided with a manager (controller) module 52, a biometrics (BIO) module 54, a public key infrastructure (PKI) module 55 and a TPM module 56. The PKI module 55 of platform 1 is provided parallel to (i.e., in a parallel architecture) and at the same level of hierarchy as the TPM module 56. Further, the BIO module 54 is provided parallel to the TPM module 56 and the PKI module 55. The chip 50 illustrated in FIG. 3 may be a (TrustCube™ is a trademark of Fujitsu Limited, Kawasaki, Japan). However, any chip configured to have user and equipment authentication information at the same level as hardware information may be used with the disclosed system and/or method.

The system 40 may implement certification of the BIO module 54, the PKI module 55 and the TPM module 56 using a certificate authority (CA) 42. The certificate authority (CA) 42 may be any trusted third party (TTP) which issues certificate(s) for use by other parties. As shown in FIG. 3, the TPM module 56 of platform 1 generates a key pair and requests a certificate from the certificate authority 42. The key pair generated via the TPM module 56 is preferably based on a hardware root of trust. For example, the TPM module 56 generates a key pair (TPM1KP/KS) using cryptography which include a private key and a public key. The TPM module 56 requests certification of the key pair from the CA 42, for example, using RSA® cryptography for public key cryptography standards (PKCS) such as PKCS#10. The CA 42 issues a certification to the TPM module 56 and sends a certificate to the TPM module 56, for example, using PKCS#7 of the RSA® standard. Although use of particular cryptography standards is described, the disclosed invention is not limited to any particular standard of certification and may use other cryptographic algorithms.

The TPM module 56 of platform 1 receives the certificate and stores the certificate therein. Similarly, the PKI module 55 of platform 1 requests a key pair and a certificate using the RSA standard (PKCS#12) from the certificate authority 42. The certificate authority 42 generates user's root key pair (URKP/URKS) and issues a certificate for PKI module 55. The certificate authority 42 then sends the key pair and the certificate, for example, using standard PKCS#12 and encrypted by TPM1KP.

The PKI module 55 receives the key pair and hands over the key pair to the TPM module 56 which decrypts the keys using TPM1KS and stores or sets the decrypted key pair in the PKI module 55. A user's Key (UK) useable for encryption key of user's data residing on platform 1 is generated by the PKI module 55 and encrypted by the user's root key (URK). As such, the user's root key (URK) is generated in the CA 42 based on both user authentication and TPM guarantee. The PKI module 55 in platform 1 uses a root key from the user's root key (URK) from the CA 42, and the URK on the path is encrypted by TPM1KP. The URK may be decrypted in the chip 50, for example implemented via a TrustCube™ chip (TrustCube™ is a trademark of Fujitsu Limited, Kawasaki, Japan), by TPM1KS and set in the PKI module 55 of platform 1.

As shown in FIG. 3, the BIO module 54 and the TPM module 56 implemented inside the chip 50 are provided in a parallel architecture, and are operable at the same level of hierarchy. The chip 50 is configured such that the PKI module 55 and the BIO module 54 are independent of and parallel to the TPM module 56, where the BIO module 54 is used for authentication of a user parallel with operations of the TPM module 56. However, the BIO module 54 and the TPM module 56 work together. For example, information of a user may be registered with the CA 42 using the PKI module 55 independent of registration of hardware information with the CA 42 using the TPM module 56, but may be certified in combination thereof. As such, the parallel configuration of chip 50 does not require that the TPM module 56 control each module inside the chip 50.

As mentioned above, registration or certification of the TPM module 56, etc., may be implemented using cryptography such as standards implemented by the RSA®. For example, PKCS#7 and #10 may be used to register a key with the CA 42 and issue a certificate from the CA 42.

Figure 4:
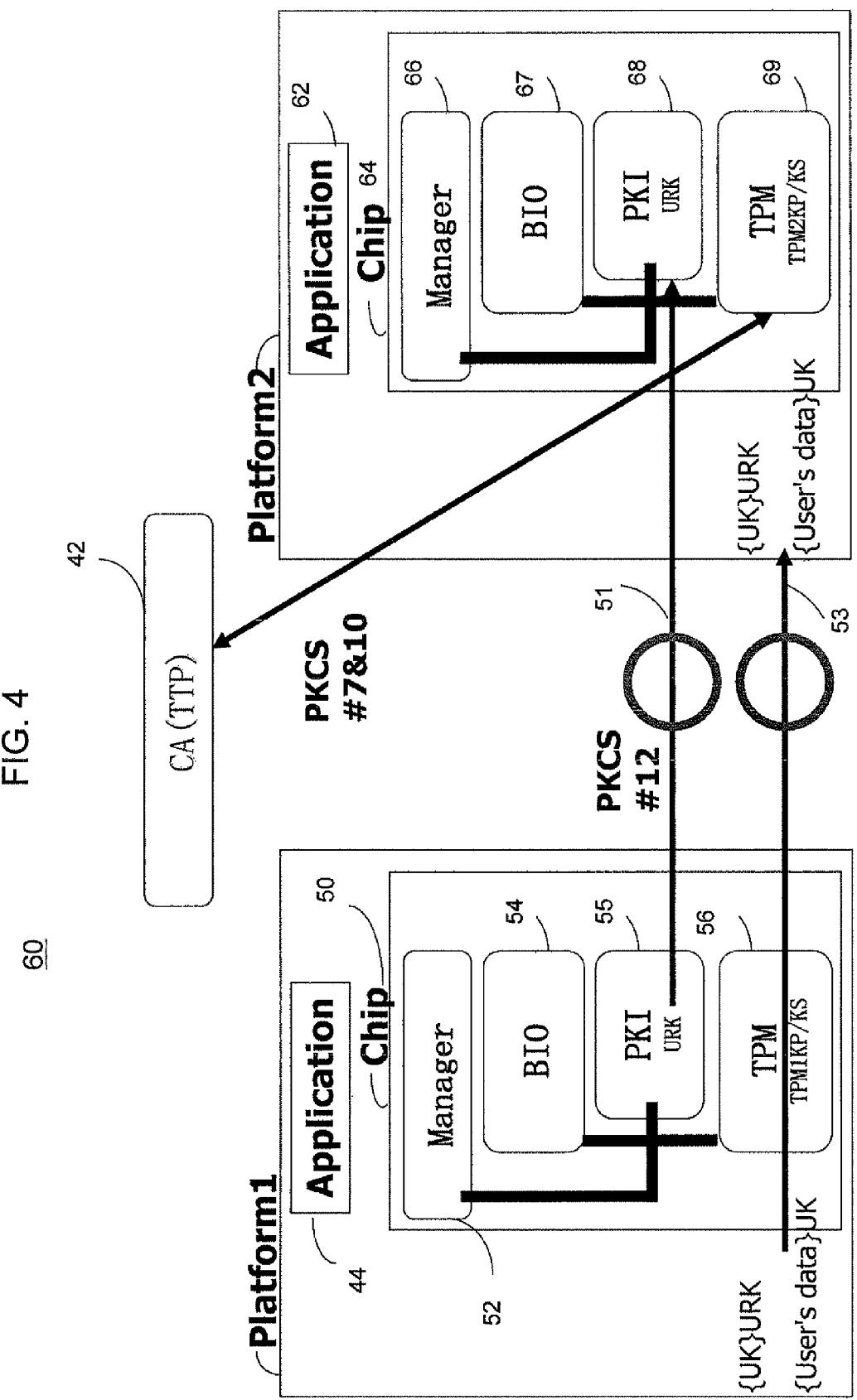
FIG. 4 illustrates a system for secure information transfer to support migration between platforms.

FIG. 4 illustrates a system 60 for secure information transfer to support migration between two or more platforms. FIG. 4 shows the platform 1 of FIG. 3 configured to transfer or migrate information of platform 1 to platform 2. Platform 2 includes an application 62 and a chip 64. The chip 64 is provided with a manager module 66, a BIO module 67, a PKI module 68 and a TPM module 69. The PKI module 68 of platform 2 is provided parallel to the TPM module 69.

Similar to the above description of TPM module 56, the TPM module 69 of platform 2 generates a key pair and requests a certification from the certificate authority 42. The key pair generated via the TPM module 69 is preferably based on a hardware root of trust. For example, the TPM module 69 generates a key pair TPM2KP/KS using cryptography including a private key and a public key. The TPM module 69 requests certification of the key pair from the CA 42, for example, sing PKCS#10. The CA 42 issues a certification to the TPM module 69 and sends a certificate to the TPM module 69, for example, using PKCS#7. The TPM module 69 of platform 2 receives the certificate and stores the certificate therein.

The PKI module 55 of platform 1 sends the keys and certificate, for example, using PKCS#12 standard. The keys and certificate sent from platform 1 are encrypted using the key TPM2KP of platform 2. As denoted in FIG. 4, the keys and certificate are sent directly (51) to the PKI module 68 of platform 2 from the PKI module 55 of platform 1. The PKI module 68 of the platform 2 decrypts the keys and certificate sent from platform 1 using TPM2KS and stores the decrypted keys and certificate to enable trusted migration of information from the platform 1 to platform 2. Although platform 1 and 2 are described in FIGS. 3 and 4, the disclosed system and method are not limited to migration between a particular number of platforms and may be implemented for use across multiple platforms.

As shown in FIG. 4, the chip 50 is implemented with each module in parallel which enables registration of information of the PKI module 55, the BIO module 54 and the TPM module 56 (PKI#1, BIO #1, TPM#1) individually. As such, data of the TPM module 56 (TPM#1) can be transferred to platform 2 because of registration and control by the CA 42. Similarly, the chip 64 of platform 2 is implemented with each module able to individually register with the CA 42. Thus, the TPM module 56 (TPM#1) and the TPM module 69 (TPM#2) are able to recognize each other and directly communicate (indicated with 53 in FIG. 4) with each other to keep information intrinsic. The TPM module 56 (TPM#1) is thus enabled to migrate trust and security to the TPM module 69 (TPM#2) TPM of platform 2. While encryption data is controlled by platform 1, encryption/decryption keys are based on information of TPM module 69 (TPM#2).

Information of the PKI module 55 is transferred to the PKI module 68 without a need to encrypt and decrypt the information when transferring from the platform 1 to the platform 2. Moreover, the TPM module 56 of platform 1 and the TPM module 69 of platform 2 directly communicate with each other (indicated with 53 in FIG. 4) such that information of how to use the transferred/migrated information is delivered to the platform 2. For example, information from the TPM module 56 is passed to the TPM module 69 where the information is not required to go through the CA 42 to be encrypted/decrypted using the information provided by the CA 42.

The user's key (UK) is generated by PKI modules (55 and 68) corresponding to platforms 1 and 2 using a file encryption. For example, user data of one platform may be exchanged using UK. As such, the user's data may be encrypted using the UK which is encrypted by the URK and does not require encrypt/decrypt to be performed for the transfer.

Further, the disclosed system 60 does not require information of the TPM module 56 of platform 1 to be always transferred to platform 2. In a case where data needs to be transferred from platform 1 for use in platform 2, information of how to use the data needs to be transferred. This enables trust to be maintained while allowing data of one platform to be used in another platform. According to the disclosed system and method, every part of a transfer or migration between platform 1 and 2 is guaranteed and not compromised.

The TPM module 56 gathers information based on software or hardware component of, for example, platform 1. Prior to a migration operation, there may be instances in which guarantees based on the TPM module 56 are used. The TPM module 56 (FIG. 3) may check each module to determine whether any module has been compromised using binary, indicated status, etc. For example, the TPM module 56 (FIG. 3) may check binary and register status, PKI module 55 signature, check reliability of the PKI module 5, etc., which may be executed by a hash or signature algorithm. Combination of user authentication with TPM based authentication provides ultimate trust by guaranteeing the TPM module 56, for example, using the CA 42, and guaranteeing the PKI module 55 using the TPM module 56.

As discussed above, the key pair TPM1KP/KS (private/secret key) generated by the TPM module 56 of platform 1 may be unsynchronized key pair RSA®. This key information does not have to be transported to platform 2. Data transported from platform 1 to platform 2, however, maintains the PKI and TPM guaranteed that the data is not compromised.

Figure 5:
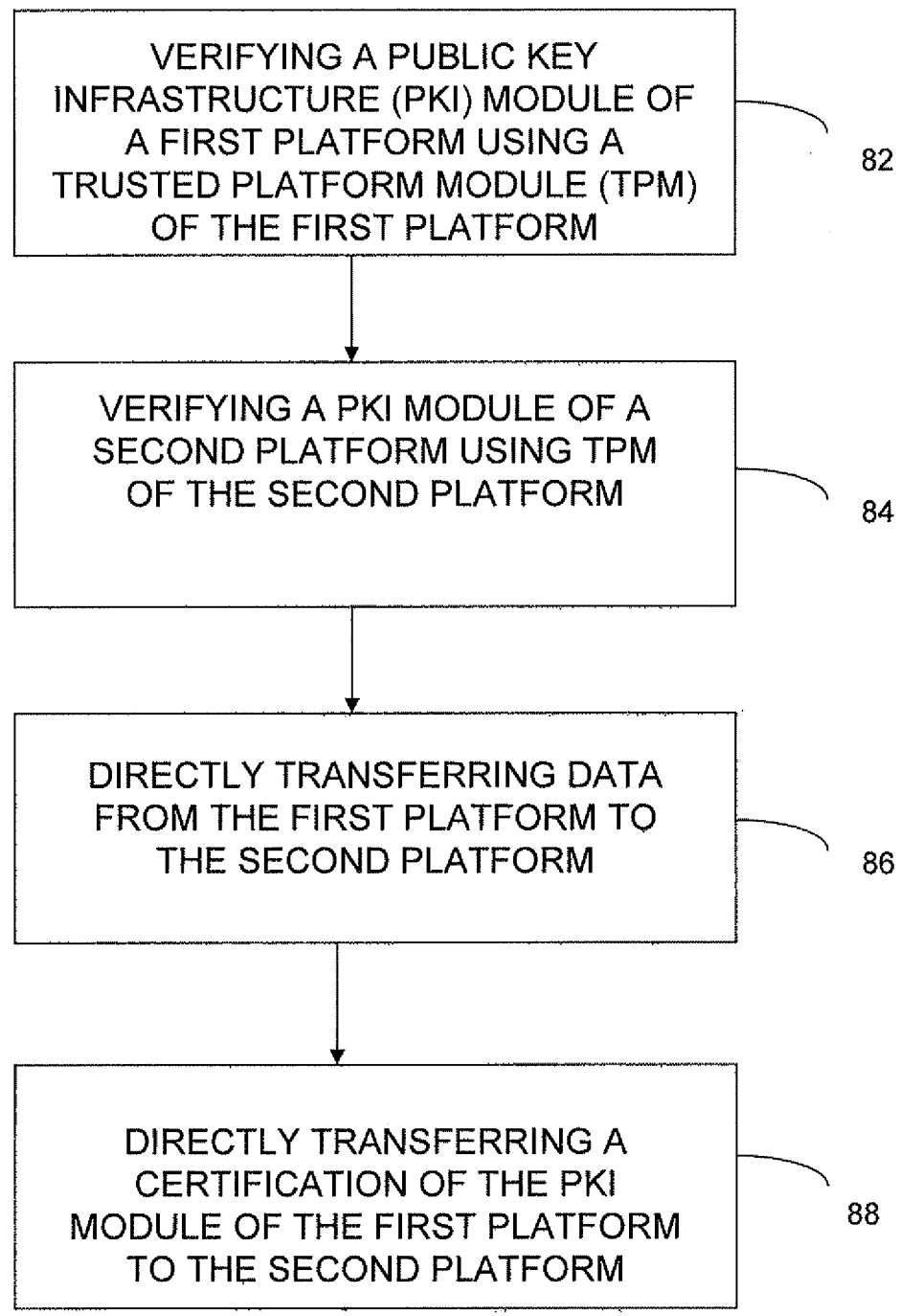
FIG. 5 illustrates a flowchart for secure information transfer to support migration between platforms.

FIG. 5 illustrates process 80 for secure information transfer to support migration between platforms. As shown in FIG. 5, process 80 begins by verifying 82 a public key infrastructure (PKI) module of a first platform using a trusted platform module (TPM) of the first platform. The PKI module of a first platform receives a certification (verification) from a TTP (Trusted Third Party). For example, as mentioned above, the PKI module may be verified (certified) in accordance with a certificate issued based on PKCS#12.

Similar to the PKI module, the TPM module shall also receive a certification from the TTP. These receiving processes of the PKI and TPM modules may be executed individually but are implemented together. For example, verifying 82 the PKI module may be based on PKCS#12, and that of the TPM module may be based on PKCS#7&10. In the PKCS#12 process, a key pair of an anti-symmetry algorithm may be generated in the TTP. On the other hand, the PKCS#7&10 process, may be generated in TPM. Although particular standards are discussed herein, the present invention is not limited to any particular communication standard or use of a predetermined protocol.

Subsequent to verifying 82, the process 80 moves to verifying 84 the public key infrastructure (PKI) module of a second platform using a trusted platform module of the second platform. Similar to the PKI and TPM modules of the first platform, verifying 84 the PKI module may be based on PKCS#12, and that of the TPM module may be based on PKCS#7&10. In the PKCS#12 process, a key pair of an anti-symmetry algorithm may be generated in the TTP. On the other hand, in the PKCS#7&10 process, that shall be generated in TPM. Although particular standards are discussed herein, the present invention is not limited to any particular communication standard or use of a predetermined protocol.

Certification of TPM of the first and second platforms indicates that the TPM of the first and second platforms are correct TPMs and have corresponding private key paired with a public key which is contained in a certification file. This certification may be issued based on a TPM original certification which is issued by a manufacturer of the TPM. The certification of the PKI modules of the first and second platforms indicate that the PKI module is a correct PKI module and has a private key paired with a public key which is contained in a certification file. This certification, for example, may be issued based on environment authentication which is performed by the TPM of the first and second platforms.

After verifying 847 process 80 continues to directly transferring 86 data from the first platform to a second platform. Information in the first platform is controlled and encrypted by PKI module of the first platform, and transferred to the second platform. The transfer/migration of information (data) in the first platform to the second platform includes moving the information from the first platform to the second platform as the information/data encrypted by PKI module of the first platform.

Subsequent to directly transferring 86, process 80 moves to directly transferring 88 a certification of the PKI module of the first platform to the second platform. The certification of the PKI module of the first platform and key pair in the certification file is transferred from PKI module of the first platform to the PKI module of the second platform. After that, information in the first platform is usable in the second platform.

Figure 6:
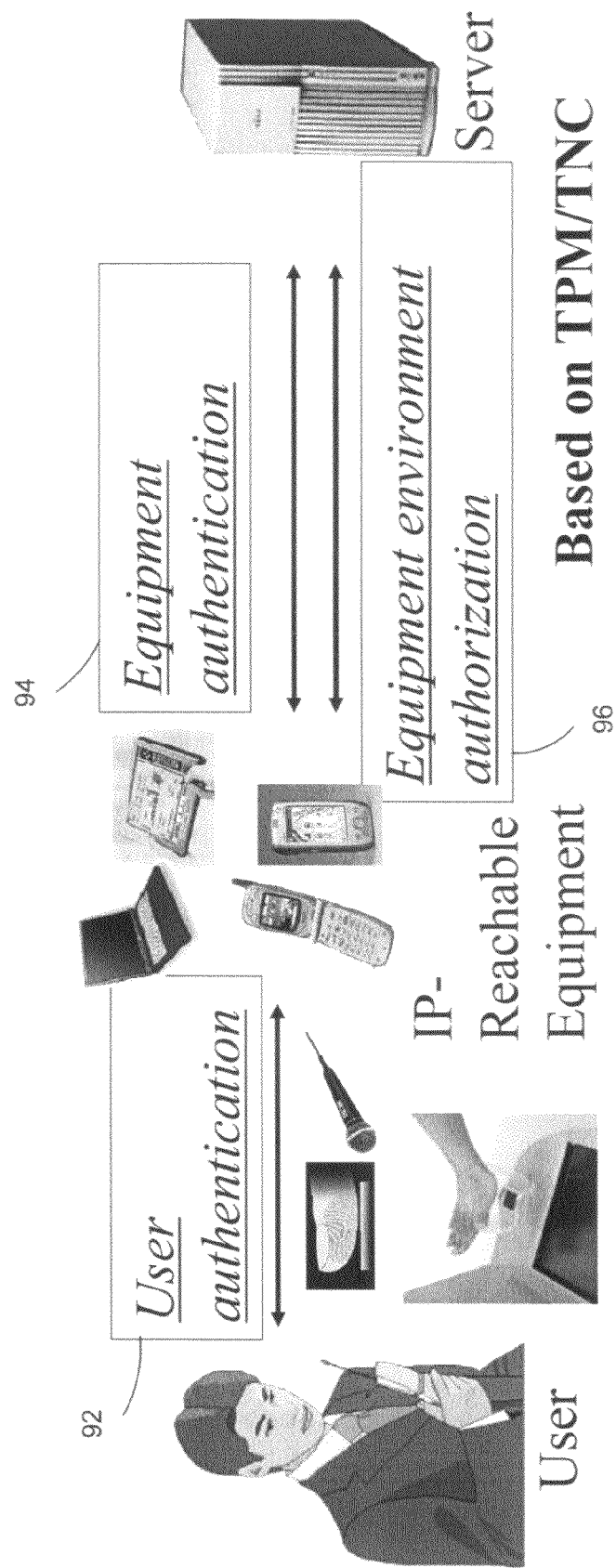
FIG. 6 illustrates a three-factor authentication concept including user authentication, equipment (platform) authentication, and equipment (platform) environment authorization.

FIG. 6 illustrates a three-factor authentication concept 90 including user authentication, equipment (platform) authentication, and equipment (platform) environment authorization. As shown in FIG. 6, the three-factor authentication concept 90 include user authentication 92, equipment authentication 94, and equipment environment authorization 96. User authentication 92 may be based on a biometric technology including but not limited to fingerprints, voice recordings, images, etc., or any other verification technique useable for identifying a user by comparing characteristics input against previously stored data for the purpose of recognition or authentication.

Equipment authentication 94 may be based on certificated data including pre-registered information implemented in an equipment based on PKI. Equipment environment authorization 96 may be based on configuration information including software, hardware and peripheral components implemented in an equipment and status of thereof such as version, security patch level and so on. Information pertaining to BIOS level, BIOS load, OS, HW, USB, peripheral, hard disk, CPU, application, etc., of an equipment or device may be authenticated. For example, the kind of software and/or hardware being used by a device may be stored in a database and current status of the software and/or hardware of the device may be authenticated based on a comparison of status obtained from the device with information in the database. Trust may be established based on user, equipment and/or equipment environment authentication. Further, level of security may be determined based on a result of user, equipment and/or equipment environment authentication.

Preferably, the user, equipment and/or equipment environment authentication is hardware based, however, an indication as to authorization or non-authorization may be software based. For example, authentication of the PKI module 55 and the BIO module 54 (FIG. 4) may be software based where mutual authentication is established between these modules. Meaning, the modules located inside the single chip 50 have established a trust among each other. The mutual authentication may be implemented using various standards including but not limited to those identified by the ISO.

As such, services based on bi-directional user, equipment, and equipment environment authentication/authorization can be provided easily, securely, and cost-effectively in accordance with the three-factor authentication concept 90, which may be implemented in a chip. Implementation of the three-factor authentication concept 90 in a single chip is explained in detail below with respect to FIGS. 7 and 8.

Figure 7:
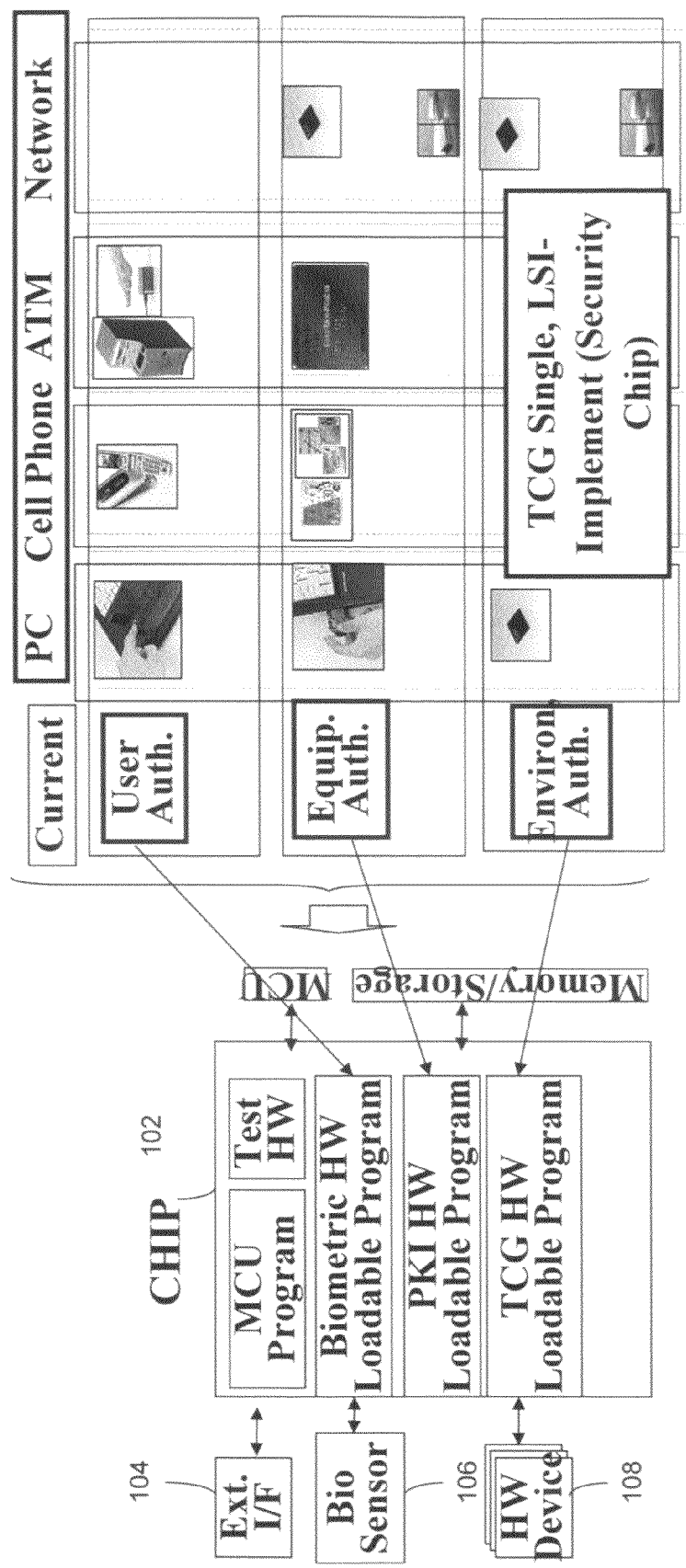
FIG. 7 illustrates a diagram of a triple integrated authentication chip.

FIG. 7 illustrates a system 100 with a triple integrated authentication chip 102. Process(es) pertaining to user authentication, equipment authentication, and equipment environment authorization separately included in a PC, a cell phone, an ATM (bank machine), and a network (i.e., router) may be implemented via a chip 102. These functions and operations may be included, either one, two, or all three, in software or in hardware of the chip 102.

As shown in FIG. 7, the chip 102 may include a MCU program, a test hardware, a biometric hardware loadable program, a PKI hardware loadable program and a TCG hardware loadable program. The user authentication information, equipment authentication information and environment authentication information are each managed by a micro controller unit (MCU).

Since the TPM is hardware based, it ensures security of the information provided. The chip 102 contains inside PKI, biometrics, TPM and a controller. The MCU controls or corroborates information and/or operations the three modules. As also illustrated in FIG. 7, the system 100 may include a memory or storage for storing information.

As shown in FIG. 7, the system may include an external interface 104, a biometrics sensor 106 and a hardware device 180 which are communicatively coupled to the chip 102. The chip 102 implements triple integrated authentication by authenticating a user, an equipment (device), and environment of the equipment. The chip 102 may be used for authentication services using information of a person (user), a device and/or an environment of the device where multi-dimensional rating/leveling/judging may be done by combining any of three kinds of rating point(s). For example, a total score/leveling of trust may be 70% as a result of assigning a value of 70% to user certainty based on biometrics, a value of 60% to platform reliability based on PKI and a value of 80% to platform environment reliability based on TPM. Further, a policy may be established to determine a level of trust needed for an application and/or access. For example, once information for authentication is received and a user, a device and/or an environment of the device is verified, a level of security is determined based on a policy where a user may be verified for a particular operation or use of information based on the authentication. While specific examples are provided herein, the disclosed invention is not limited to any particular factor, source or policy pertaining to authentication and may establish a trust using multiple authentication sources, one or more policies, and a multi-factor authentication.

As shown in FIG. 7, a multi-factor authentication may be implemented via the chip 102 using multiple sources (i.e., biometrics, smartcard, etc) authenticated in sequence. In any given situation, failure to authenticate information received from any single source may result in denied access, or may provide a limited level of access. Using the multi-factor authentication (see also FIG. 6) capable of implementing authentication using more than a single authentication source, the disclosed system is able to establish a more secure communication. Further, the disclosed system and method provide information protection before delivery of the information based on authentication of a user, a device and/or an environment of the device executed via the chip 102.

As mentioned above, a policy may be established to determine a level of trust needed for an application or an access. This enables the disclosed system and method to provide a flexible technique (approach) for authentication based on integration of multiple authentication source(s) and a trust established using a multi-dimensional rating/leveling/judging. For example, the system 100 may implement a trust model offering a high level of protection for sensitive information requiring a higher level of trust requirement(s) (policy) in comparison with a trust model set for less sensitive information. The system 100 offers a level of protection corresponding to trust requirement(s) needed for an access and/or use, and endorses a reliability of a client platform and a user based on multiple authentication sources (i.e., TPM, PKI, and other sources). Result(s) of the endorsement result (report) is based on the integration of multiple sources (i.e., authentication, TPM, and other factors). As such, the endorsement result of the system 100 is not a binary result.

Figure 8:
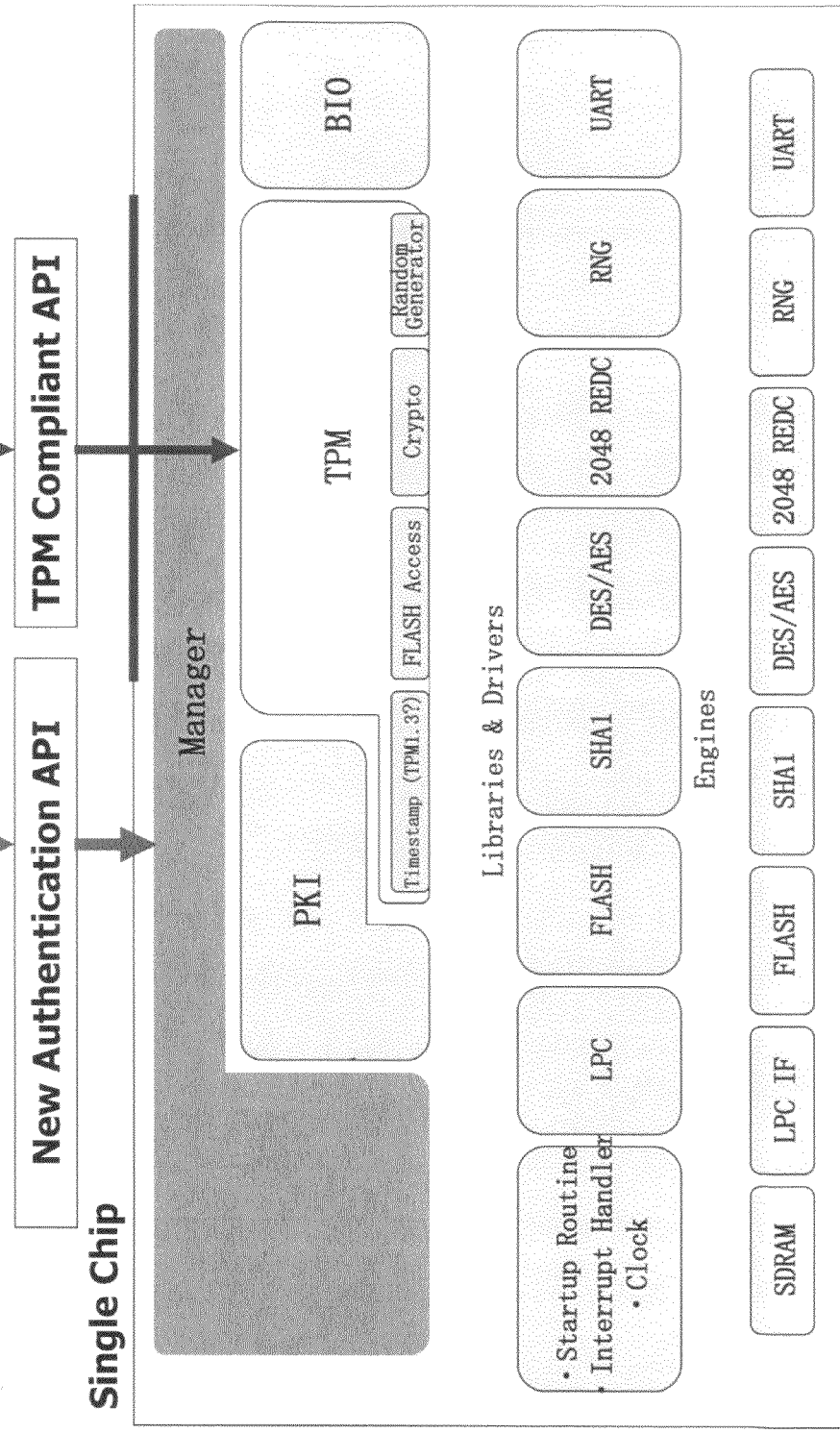
FIG. 8 illustrates a chip structure implemented in a system for secure migration.

FIG. 8 shows a single chip structure implemented in the disclosed system for secure migration. As shown in FIG. 8, the chip structure includes a public key infrastructure (PKI) module, a trusted platform module (TPM) and a biometric (BIO) handling module, which are provided at the same level of hierarchy.

The chip may include a low pin count interface specification (LPC), a flash memory specification (FLASH), a hash function (SHA1), a data encryption standard (DES/AES), an encryption standard (2048 REDC), a random number generator (RNG), and a universal asynchronous receiver/transmitter (UART).

The chip of the present invention receives data from the TPM compliant API (which is known in the art) and/or from the new authentication API to use a combination of the three-factor authentication concept discussed in FIG. 6 through a manager 52 (FIG. 3). The new authentication API allows for interaction with the BIO, the PKI, and the TPM, whereas the TPM compliant API allows interaction only with the TPM. The chip shown in FIG. 8 may have typical components of a chip for use with a device or system. Further, as mentioned above, the chip shown in FIG. 8 may be implemented using a TrustCube™ chip (Fujitsu Limited, Kawasaki, Japan). However, any chip configured to have the BIO, TPM and PKI components at the same level of hierarchy controlled by a manager or controller may be used.

Accordingly, the disclosed system and method enable data of one platform to be useable in another platform. The data may be user data including but not limited to who created the data, who used the data, etc. Data migrated from one platform to another is not limited to user data and may include any information residing on a platform which a user wants to use in another platform.

In an embodiment, the present invention also includes computer-readable storage media enabling a computer to execute the processes or operations described herein, and the processes or operations may be implemented in software and/or computing hardware.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of secure information transfer to support migration, comprising:

certifying a public key infrastructure module of a first platform, the public key infrastructure module being certified using a trusted platform module of the first platform; and migrating data of the first platform to a second platform; and wherein the data is made useable in the second platform by directly establishing hardware based trust between a trusted platform module of the second platform and the trusted platform module of the first platform other than by transferring a key from the first platform at the migrating, and where the public key infrastructure module is controlled in parallel with the trusted platform module of the first platform and the trusted platform module of the second platform.

2. The method according to claim 1, wherein the public key infrastructure module of the first platform encrypts keys and a certificate based on the trusted platform module of the second platform, and sends said keys and said certificate to the second platform.

3. The method according to claim 2, wherein said keys and said certificate are decrypted in the second platform.

4. The method according to claim 1, wherein the public key infrastructure module and the trusted platform module of the first platform are implemented via a single chip.

5. The method according to claim 1, wherein the public key infrastructure module and the trusted platform module of the first platform are each provided with a certificate in parallel from a trusted third party.

6. The method according to claim 5, wherein the public key infrastructure module and the trusted platform module of the second platform are each provided with a certificate in parallel from the trusted third party.

7. The method according to claim 4, wherein authentication of a user, an equipment and environment of the equipment, or any combination thereof in the first platform is performed via said chip.

8. The method according to claim 2, wherein said certificate is issued by a manufacturer of the trusted platform module of the second platform.

9. The method according to claim 4, wherein the public key infrastructure module of the first platform is implemented in a level of hierarchy identical to the trusted platform module of the first platform.

10. The method according to claim 5, wherein said certificate is issued based on a hardware root of trust.

11. A non-statutory computer readable storage medium having a program stored therein to cause a computer to execute operations, comprising:

certifying a public key infrastructure module of a first platform, the public key infrastructure module being certified using a trusted platform module of the first platform; and migrating data of the first platform to a second platform based on certification of a trusted platform module of the second platform using key data sent from a chip implemented with the first platform, and where the public key infrastructure module is controlled in parallel with the trusted platform module of the first platform and the trusted platform module of the second platform, and where the data is made useable in the second platform by directly establishing hardware based trust between the trusted platform module of the first platform and the trusted platform module of the second platform other than by transferring a key from the first platform at the migrating.

12. The computer readable medium according to claim 11, wherein the public key infrastructure module of the first platform encrypts keys and a certificate based on the trusted platform module of the second platform, and sends said keys and said certificate to the second platform.

13. The computer readable medium according to claim 11, wherein said keys are generated based on public key cryptography standards (PKCS).

14. An apparatus, comprising
a chip implemented with a public key infrastructure module and a trusted platform module of a first platform; and
a controller controlling the public key infrastructure module parallel with a trusted platform module of a first platform, and
where data of the first platform is migrated to a second platform and the data is made useable in the second platform by directly establishing hardware based trust between a trusted platform module of the second platform and the trusted platform module of the first platform other than by transferring a key from the first platform at migrating of the data, and
the public key infrastructure module is controlled in parallel with the trusted platform module of the first platform and the trusted platform module of the second platform.

15. The apparatus according to claim 14, wherein the public key infrastructure module of the first platform encrypts keys and a certificate based on the trusted platform module of the second platform, and sends said keys and said certificate to the second platform.

16. A method, comprising:
verifying data of a first platform using a certificate issued based on a security module of the first platform; and
migrating the data from the security module of the first platform to a security module of a second platform, and
where the public key infrastructure module is controlled in parallel with the security module of the first platform and the security module of the second platform, and
where the data is made useable in the second platform by directly establishing hardware based trust between a security module of the second platform and the security module of the first platform other than by transferring a key from the first platform at the migrating.

17. The method according to claim 16, wherein the security module of the first platform is a trusted platform module (TPM).

18. The method according to claim 17, wherein the security module of the second platform is a trusted platform module (TPM).

19. The method according to claim 16, wherein the data is authenticated based on a certificate of the security module of the second platform.

20. The method according to claim 18, wherein the data is used based on a certificate authenticated by the trusted platform module of the second platform.

* * * * *